Oct. 30, 1945.   C. E. COLEMAN   2,387,718
EXTRUSION APPARATUS
Filed Nov. 10, 1942   4 Sheets-Sheet 1
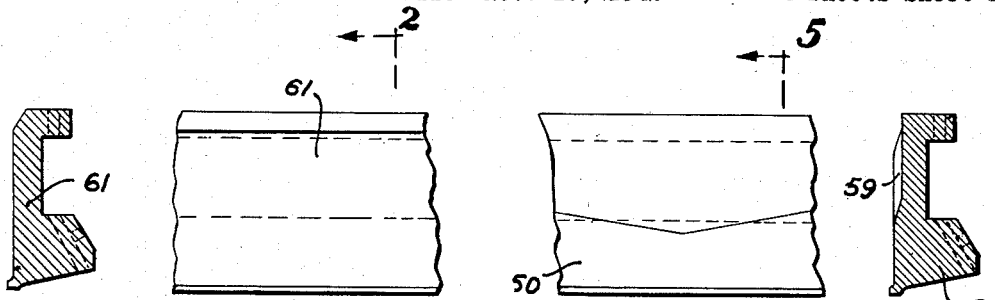
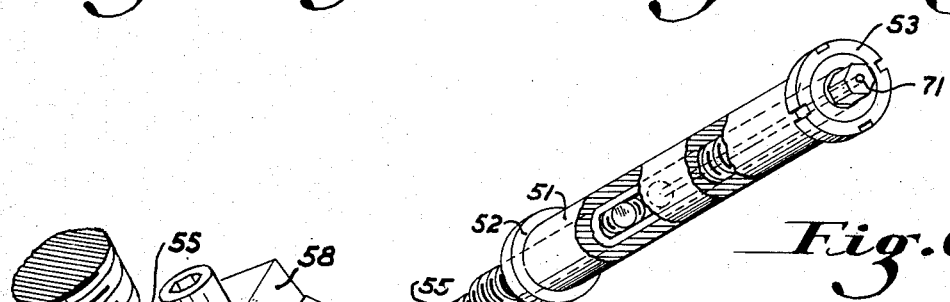
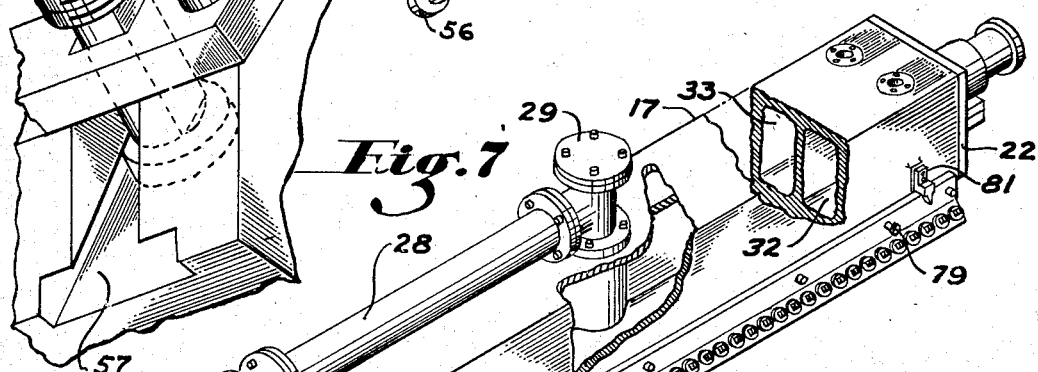
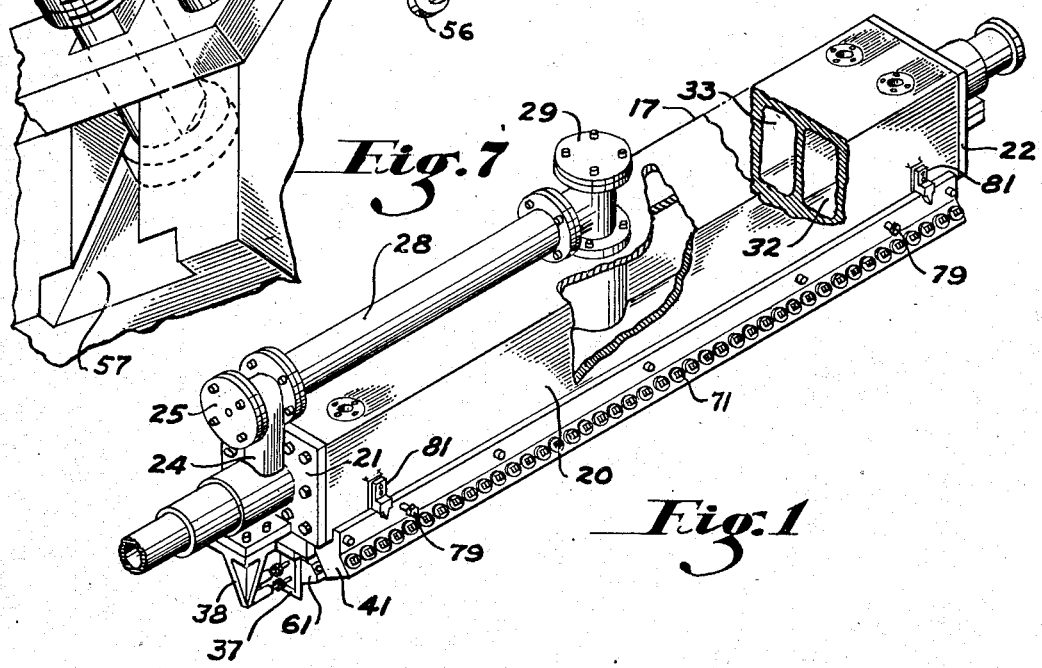
Clarence E. Coleman INVENTOR.
BY
ATTORNEY

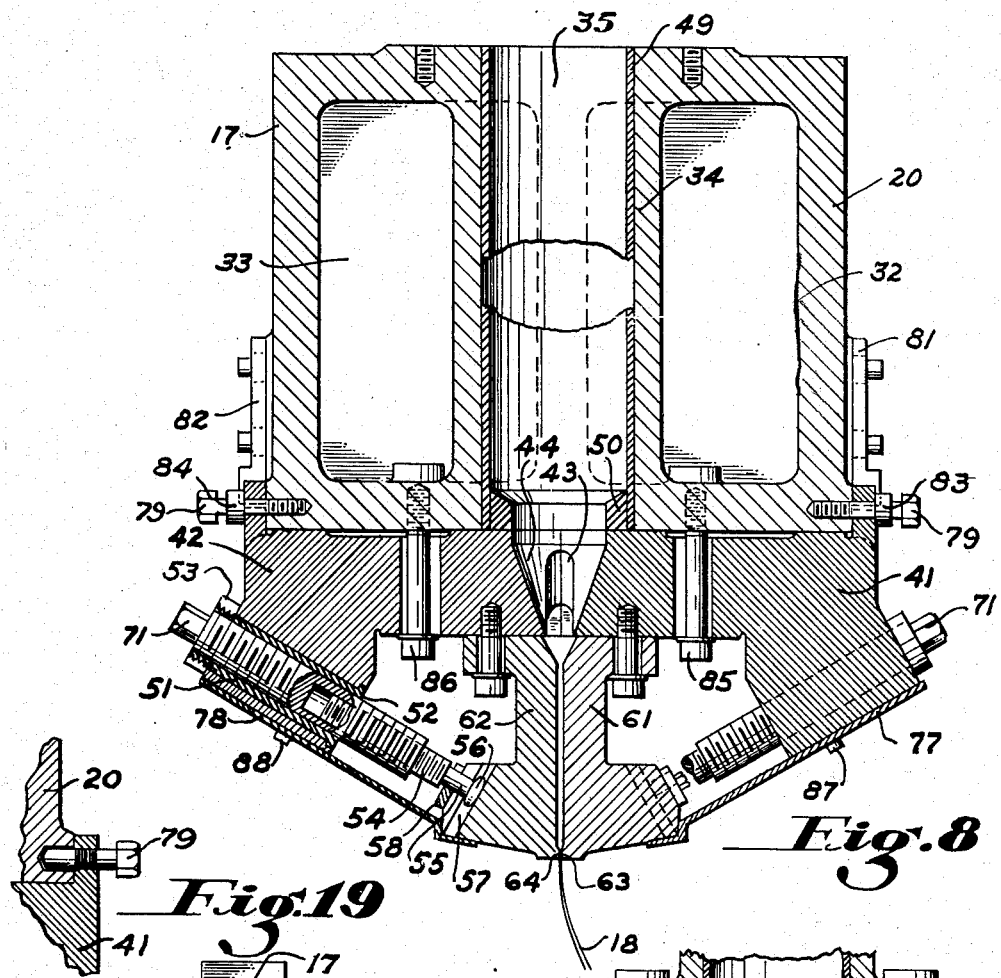
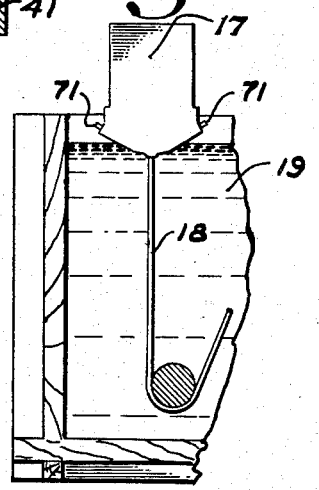
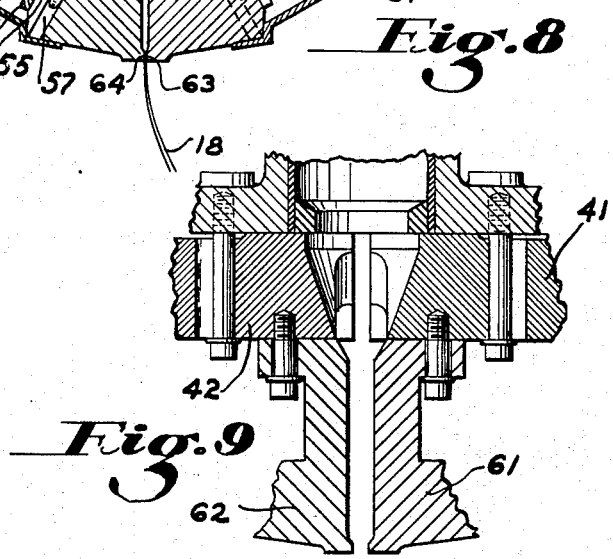

Oct. 30, 1945. C. E. COLEMAN 2,387,718
EXTRUSION APPARATUS
Filed Nov. 10, 1942 4 Sheets-Sheet 3
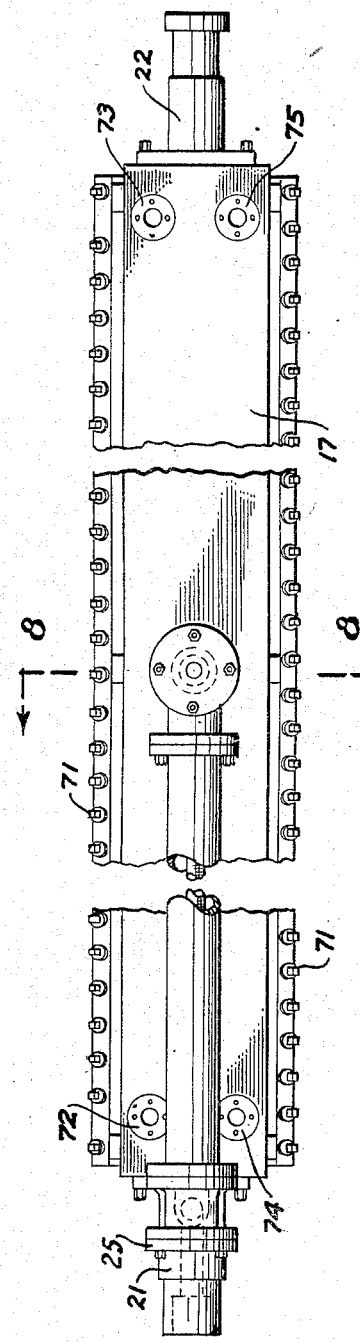
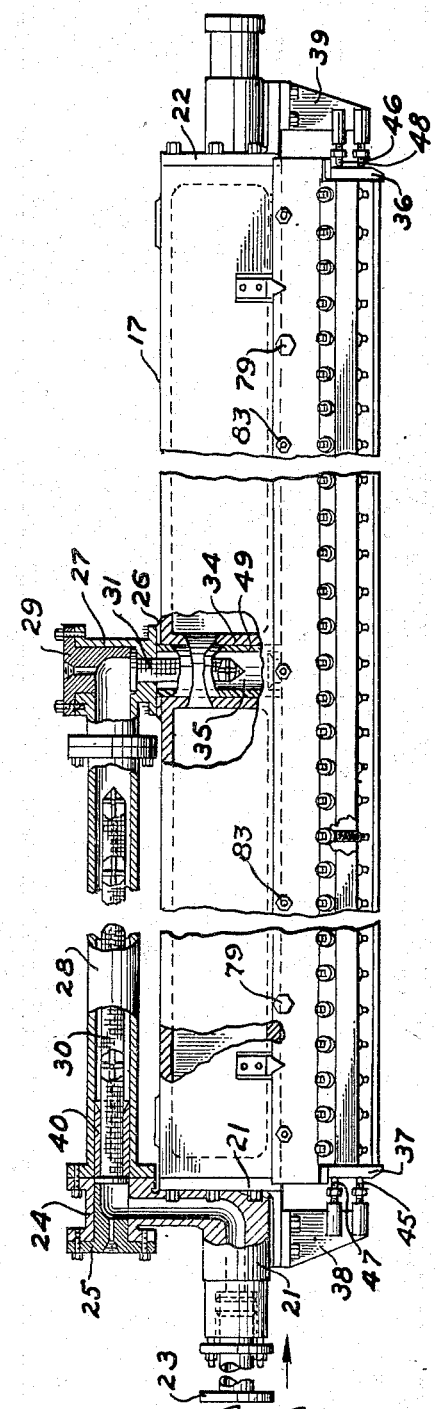
Clarence E. Coleman INVENTOR.
BY
ATTORNEY Oct. 30, 1945. C. E. COLEMAN 2,387,718
EXTRUSION APPARATUS
Filed Nov. 10, 1942 4 Sheets-Sheet 4
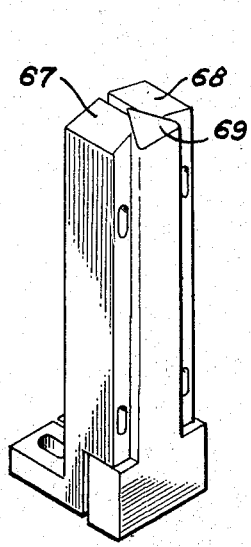
Fig. 17
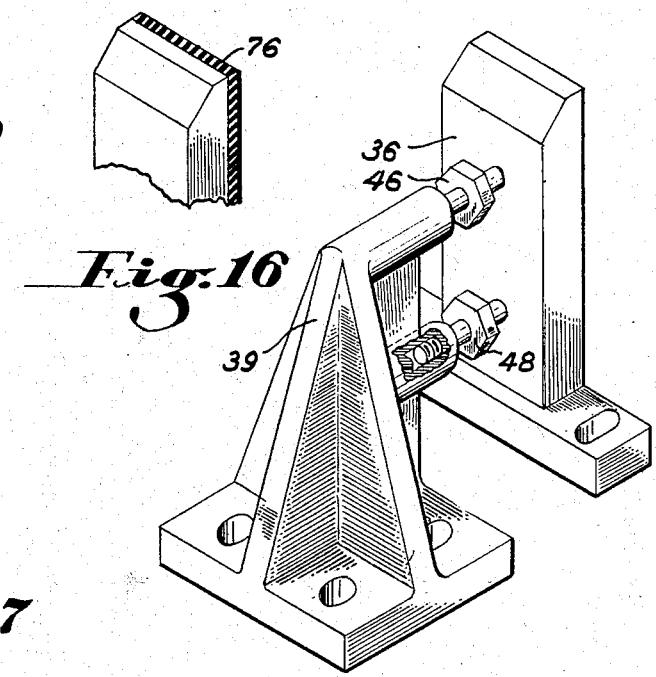
Fig. 16
Fig. 15
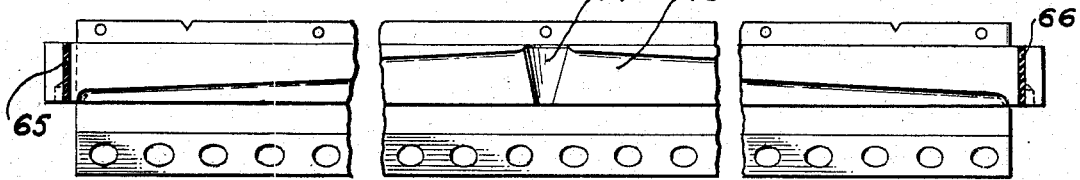
Fig. 14
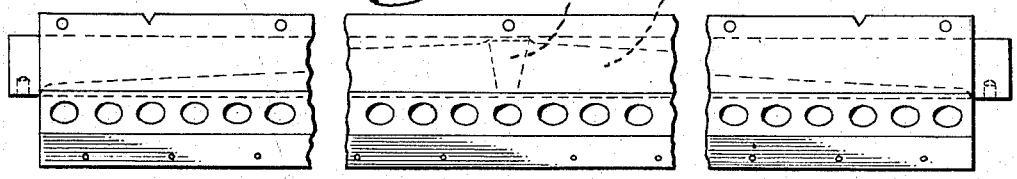
Fig. 13
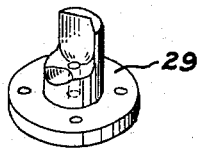
Fig. 18
Clarence E. Coleman INVENTOR.
BY
ATTORNEY Patented Oct. 30, 1945

2,387,718

UNITED STATES PATENT OFFICE 2,387,718

EXTRUSION APPARATUS

Clarence E. Coleman, Buffalo, N. Y., assignor to E. I. du Pont de Nemours & Company, Wilmington, Del., a corporation of Delaware Application November 10, 1942, Serial No. 465,138

5 Claims. (Cl. 18—15)

This invention relates to the manufacture of non-fibrous films or sheets from film-forming compositions. More particularly it appertains to a new and improved film extrusion apparatus for the continuous extrusion of viscose and similar cellulosic film-forming compositions.

In the manufacture of regenerated cellulose films or sheets from viscose it is customary as the first step in the operation to extrude or squirt the viscose composition continuously through an elongated orifice into a coagulating bath to form a continuous gel cellulosic film. Usually the orifice is formed by the space between two elongated metal plates called "lips" which are positioned at the bottom of the extrusion apparatus, and which during the film-forming operation remain submersed in the coagulating liquid. Heretofore one or both of these lips have had means by which their position, relative to each other, could be adjusted to regulate the thickness of the sheet material. In order to obtain satisfactory sheets and films, it is necessary to provide the lips with a large number of individually operative adjustment devices along the length thereof. The satisfactory adjustment of the lips is therefore a time consuming, laborious operation.

Although many improvements and modifications have been made in film extrusion apparatus, prior to the present invention, such apparatus has been incapable of properly controlling the beads (thickened edges) and adjacent portions of the web. Such previously known apparatus has also precluded satisfactory control of "bands" and "off-gauge" characteristics in films and sheets produced therewith. Furthermore, in previously known film extrusion apparatus it has been necessary to disturb the fine lip adjustment whenever it became necessary to open the same for cleaning purposes. This necessitates a laborious resetting of the lip adjustment before the extrusion operation can be resumed.

"Bands" are portions of the sheet which may be thicker or thinner than other portions of the sheet. They may be very narrow ($\frac{1}{16}$ in.) or they may be an inch or more in width. Longitudinal bands in the sheet may either originate at the lips at the time of extrusion or may develop in the course of processing and drying. Bands originating at the lips may be accentuated in the course of drying of the sheets. Clearly visible bands may be produced by a variation from the base sheet thickness of 0.00001 to 0.00005 inch.

"Off-gauge" characteristics in a sheet or film will frequently result from a failure to compensate for non-uniform shrinkage of the sheet in subsequent processing operations. The extruded sheet shrinks in the coagulating bath, again in the desulfuring bath, and again during drying. A finished dry sheet is only slightly greater than one-half its extruded width. Since the sheet is continuously passing over a series of rolls during the processing thereof, it shrinks least at the center portion thereof and in progressively greater amount toward the edges. The lips adjacent the extrusion orifice must be adjusted to compensate for the non-uniform shrinkage and increase in sheet thickness.

There are many other objectionable features, in film extrusion apparatus now in general use which have come to be accepted as necessary evils. For example, the main body section of the apparatus is usually of two-piece construction, made up of U-shaped sections bolted together. These sections are ribbed, and have the viscose channel machined out of the center section. Such apparatus cannot be cooled or heated with any medium other than the viscose or surrounding room air. Temperature differences of as much as 5° or 6° C. are frequently found to exist between one end of the hopper and the other.

Rigidity and symmetry are lacking in previously known extrusion apparatus. The viscose is fed into one end of the apparatus, resulting in an appreciable pressure drop from the feed end to the dead end, necessitating a lip adjustment to compensate for the partial drop. This feeding arrangement also requires that the hopper be designed for right and left hand, and as a result, complicates somewhat the viscose piping and stocking of parts. It is not possible with present constructions and assemblies to make a permanent lip setting, because of the drifting due to variations in temperature and pressure. The effect of making an adjustment is slow, and several mill rolls of the sheet material may be cast before the full effect is secured and over or under correction eliminated.

The cross-section of the lips is such that with temperature changes the contraction or expansion of one lip is greater than the other, with resultant leakage at the end blocks. Considerable trouble has always been experienced in fitting the end blocks to the present type of lip now used.

The lip cross-section now employed does not lend itself to uniform adjustment, and requires that excessive forces be applied in a manner which warps the extrusion edge of the lips. Certain of the adjusting screws are in compression and others in tension, while still others may be free or floating. When a lip is under considerable stress, therefore, an adjustment made on one side of the center line of the extrusion orifice may affect a considerable portion on the opposite side of the center line, with the resulting production of off-gauge material. Lips can be sprung or damaged if adjustments are carried too far at any one point. It follows that present lip sections are not designed properly to permit the accurate adjustment needed to control bands.

Any change in pressure within the extrusion apparatus due to slow-down usually results in a movement of the lip, which does not return to normal after extrusion speed is resumed.

Ordinarily a flat screen is inserted in the extrusion apparatus between the main body section and the lips. Gelled viscose, collecting on the upstream side of this screen, will therefore affect the pressure in the area directly below, with a resultant unevenness in gauge. Screens of this type are very difficult to remove and replace.

The common lip constructions provide a wedge-shaped channel between the main body section of the apparatus and the extrusion edges of the lips. Since this channel is below the screen, and the extrusion edges of this type of lip build up very little back pressure, viscose readily gels along the inside faces of the lips due to the reduced flow, and the gel particles work down to the extrusion edges, causing such troubles as uneven thickness in the film at the extrusion edge.

The adjusting screws commonly employed do not permit a micrometer adjustment, and they are usually supported in such a position that they are subject to corrosion due to their contact with the coagulating bath.

There are, as is well known to those familiar with the field, many other drawbacks to the film extrusion apparatus now in use. The foregoing is intended merely to direct attention to the more important problems which, prior to this invention, existed in the field.

It is therefore an object of this invention to provide a new and improved film extrusion apparatus which will substantially eliminate the above-mentioned constructional defects of previously known apparatus.

It is another object of this invention to provide a film extrusion apparatus with means for accurately adjusting the contour of the extrusion edges of the lips and also with means for separating said lips for cleaning purposes without disturbing the contour of the extrusion edges of said lips.

It is still another object of this invention to provide a film extrusion apparatus with means to more adequately control the extrusion orifice against band formation and non-uniformities in gauge.

It is a further object to provide film extrusion apparatus which will have a minimum of drift and which will have means for suitably controlling film edges.

Other objects of the invention will appear hereinafter.

How the foregoing objects and related ends are accomplished will be apparent from the following detailed description in which are disclosed the principle and divers embodiments of the invention, including the best mode contemplated for carrying out the same. The written description is amplified by the accompanying drawings, in which:

Figure 1 is a perspective view, with portions broken away, showing one embodiment of film extrusion apparatus constructed in accordance with this invention;

Figure 2 is a sectional view taken along the line 2—2 of Figure 3, and showing one form of lip cross-section;

Figure 3 is a fragmentary side elevation view, looking toward the inside of the preferred form of lip structure;

Figure 4 is a fragmentary side elevation view similar to Figure 3 of a modified form of lip structure;

Figure 5 is a sectional view taken along the line 5—5 of Figure 4;

Figure 6 is a perspective view, partly in section, of one of the lip differential adjusting screws and some of its associated parts;

Figure 7 is a fragmentary perspective view showing the manner of connecting one of the differential adjusting screws to the film extrusion lip;

Figure 8 is an enlarged sectional view of the film extrusion apparatus taken along the line 8—8 of Figure 11;

Figure 9 is a fragmentary sectional view; similar to Figure 8, showing the lips of the extrusion apparatus and their supporting blocks separated for cleaning;

Figure 10 is a diagrammatic view, partly in section, showing the extrusion and wet casting of a film of viscose;

Figure 11 is a fragmentary top plan view of the film extrusion apparatus;

Figure 12 is a fragmentary side elevation view, with parts in section, of the apparatus shown in Figure 11;

Figure 13 is a side elevation view of the outside of one of the adjustable supporting blocks;

Figure 14 is a side elevation view of the inside of one of the adjustable supporting blocks.

Figure 15 is a perspective view of an inverted end block supported by its end block bracket and pressure screws;

Figure 16 is a fragmentary view showing a modification of the end closing means; Figure 17 is a perspective view of still another modification of end closure;

Figure 18 is a perspective view of one of the viscose solution feed line piping flanges, and Figure 19 is a fragmentary sectional view of a screw means for forcing the supporting blocks from the main body of the apparatus.

For convenience, the invention will be described utilizing the terms commonly employed in the manufacture of regenerated cellulose sheet from viscose, but it is to be understood that film-forming solutions other than viscose, and sheet materials other than regenerated cellulose, can be handled with the same apparatus.

Referring now to Figure 10, it will be seen that although the film extrusion apparatus 17 of this invention releases the sheet of viscose 18 into the coagulating and/or regenerating bath 19 in the usual manner the lip adjusting screws 71 on both sides are accessible above the liquid level.

The film extrusion apparatus 17 of the present invention is shown in detail in Figures 1 to 8 and 11 to 19 and comprises a closegrain castiron body 20 to which are bolted end castings 21 and 22 of like material. Trunnions for the support of the hopper are formed on the end castings 21 and 22. The bearings which receive the trunnions are of a conventional character, and need not be described in detail herein. Carried on the under side of the body 20 and secured thereto by bolts such as 85 and 86 are adjustable supporting blocks 41 and 42 which support and position the film extrusion lips 61 and 62.

The viscose enters the apparatus through the hollow trunnion on the end plate 21 from the pipe fitting 23, as shown at the left-hand side of Figure 12. In order that the apparatus may be turned on its trunnions, a stuffing box type of connection is utilized. A projecting part on the casting 21, generally resembling a flanged pipe T, is indicated at 24. The viscose duct or passage in the casting is elbow-shaped, and by means of a flanged fitting 25 fitting into the cross part of the T, a reverse elbow channel completing an offset is formed.

A central boss 26 on the hopper body receives a special T 27, and a flanged pipe section 28, preferably of stainless steel, connects it to the T 24. A flanged fitting 29, similar to the fitting 25, fits in the T 27 to make an elbow channel for the viscose. Small holes with removable plugs in the parts 25 and 29 are for bleeding air, taking pressure readings and/or connecting pressure domes to damp out viscose feed pump pulsations.

For preventing access of solid or gel particles to the interior of the hopper, cartridge screens, preferably of Monel metal, are utilized. A preliminary filtration screen is located in the pipe 28 and is positioned by its flange bearing on tube 40 press fitted into pipe 28. It can be removed for cleaning by drawing it through the T-part 24, when the flange 25 is removed. The final filtration screen 31 is held in the T 27 by the flange on its adit end, and, similarly to the screen 30, it can be removed for cleaning or replacement by removing the flanged insert 29.

The main body section 20 of the apparatus is cored to provide two temperature regulating water chambers 32 and 33. Centrally of the ends of the body, the web dividing these chambers joins a tubular portion 34 which receives the aforementioned screen 31 and provides a passage 35 for the viscose from the T 27 to the viscose channel 43 between the blocks 41 and 42. This tubular portion has a liner 49 of corrosion resistant metal, preferably stainless steel. A conical recess 44 which tapers the aforementioned passage 35 to a diameter equal to the width of the said channel abuts an interior adaptor 50 of stainless steel pressed into and welded to the tube liner.

This viscose channel between the supporting blocks 41 and 42 tapers toward the ends of the blocks, as shown in Figures 13 and 14, for the purpose of producing uniform velocity of the flow of the viscose from the center to both ends.

Bolted (see Figure 8) to the castiron supporting blocks 41 and 42, with their final extrusion edges 63 and 64 in proximity to each other, are the extrusion lips 61 and 62. Also bolted to these supporting blocks are end blocks 36 and 37 (see Figures 1 and 12) which close the ends of the passageway between the extrusion lips. Pressure to force these end blocks against the lips is supplied by brackets 38 and 39, bolted to the extrusion apparatus ends 21 and 22, and adjusting bolts 46 and 48, and 45 and 47 which are threaded into said brackets.

The adjustment of the extrusion aperture between the final extrusion edges 63 and 64 of the extrusion lips is made by means of differential adjusting screws such as 71. The supporting blocks 41 and 42, are drilled to receive chrome-nickel steel bushings, such as 51, interiorly threaded for co-action with the larger diameter part of the differential screw 71. The bushing 51 has a flange 52 at one end, and an exterior bronze lock-nut 53 at the other end, to maintain it in the supporting block. The differential adjusting screw comprises a chrome-nickel steel smaller bolt unit 54 threaded into the interior of the larger diameter bronze unit which is threaded in the bushing 51. The unit 54 has a non-circular shank portion 55, preferably formed by milling diametrically opposed flats on the round stem 55 leading to the head portion 56. The extrusion lips 61 and 62 have under-cut slots such as 57, to receive the head 56 which is slightly rounded where it bears on the bottom of the slot. The neck portion of this slot is wide enough to receive the full diameter of the stem 55. Overlying the slots is an adjusting screw locking plate 58 of stainless steel or like metal, notched or otherwise cut to receive the milled flat portions on the stem 55 for the purpose of preventing rotation. This strip is bolted to the hopper lip over the slots 57.

For an extrusion orifice 82 inches long, an arrangement whereby there are 40 differential adjusting screws on one side and 41 on the other, spaced on 2 inch centers and staggered with respect to the opposing lips, has been found satisfactory. In the interest of more satisfactory end adjustment, the two end adjusting screws on the 40 unit side have a spacing slightly greater than 2 inches.

As shown in Figures 1 and 8, the main body section of the extrusion apparatus carries bronze guides 81 on one side and 82 on the other. The supporting blocks have V-shaped notches to receive these guides. The supporting blocks are also provided with "backing-off" screws 79, which are positioned in openings in the body section 20 of the apparatus. These "backing-off" screws 79 are adapted to draw the blocks 41 and 42 from their operative positions (see Figures 8 and 19). When it is desired to clean the extrusion apparatus, the bolts 83 and 84, and 85 and 86 are loosened and the blocks slid apart on the aforementioned guides by means of the backing-off screws 79. The holes in the blocks which receive the bolts 85 and 86 are elongated to permit this sliding motion without complete removal of the bolts. This arrangement permits the extrusion lips to be separated, cleaned and brought back to their proper relation without destroying the lip adjustment obtained by the differential screws 71.

Referring now to Figure 11, the numerals 72 and 73 indicate ports for the chamber 33, and the numerals 74 and 75 indicate ports for the chamber 32. Since the chambers 32 and 33 are not connected interiorly of the body section 20, one of its ports serves as an inlet and the other an outlet for the temperature regulating medium. In practice it has been found convenient to connect the ports at one end, for example 73 and 75, and allow the heating or cooling medium to flow through the two chambers in series. With the aforementioned exemplary connection, water at the proper temperature would enter the port 72, flow through the chamber 33, pass out through the port 73, and through the connecting pipe enter the port 75, pass through the chamber 32 and leave the hopper at the port 74.

After the supporting blocks 41 and 42 are assembled, small holes are drilled therethrough in a center line through their meeting faces, and rod-like gaskets 65 and 66 pressed therein to obviate any viscose seepage at the ends from the channel 43 (see Figure 14).

Non-corrosive sheet metal splash plates 77 and 78, secured to the screw blocks 41 and 42, respectively, by screws 87 and 88, cover the adjustable differential screws.

In a modified form of the invention (see Figure 16), a neoprene, rubber, or like material slab 76 is placed between the end block 36 and the ends of the extrusion lips for the purpose of improved sealing. In still another modification, the end block is formed by two separate units 67 and 68, having chamfered corners to provide a triangular groove to receive a triangular rubber or plastic end block or gasket 69. The block 69 is positioned against the ends of the extrusion lips (see Figure 17).

In the preferred embodiment, the channel 43 between the supporting blocks 41 and 42 is tapered, and the channel between the lips 61 and 62 has a uniform depth and width. In some cases it may be desirable to reverse this arrangement, and such a modification is shown in Figures 4 and 5 wherein the lip 50 has a portion cut away at 59 to provide a back pressure channel diminishing in the direction of flow between the lips.

Except for the differential screws 71, which have hex heads, it is preferred that the various bolts have countersunk wrench-receiving portions.

Preferably the main body section 20 and the adjustable supporting blocks are made of close grained castiron which will have a coefficient of expansion as nearly the same as the metal of which the extrusion lips are constructed as possible. The body section 20, the adjustable supporting blocks 41 and 42 and the extrusion lips 61 and 62 are preferably heat treated to remove casting strains imparted thereto between the rough and final machining.

Many of the advantages of the present invention will be obvious immediately to the workers skilled in this field. It should be noted particularly that the entire assembly is generally symmetrical about all center lines. The viscose is supplied to the center of the extrusion apparatus. The adjustable supporting blocks, which ordinarily furnish the back pressure channel for the extrusion lips, bear a mirror image relation to each other, as do the lips themselves. Cartridge screens, which can readily be removed for cleaning, are located at places where they have no effect on the pressure of the viscose in the channel between the lips. The lips are of an entirely different cross-section than those employed in the extrusion apparatus now utilized, and when adjustments are made in the extrusion orifice the lip section is flexed, thereby eliminating the undue strain and sliding contact between lip and supporting base which existed in prior art extrusion apparatus.

Since it is obvious that many changes and modifications can be made in the details above described without departing from the nature and spirit of the invention, it is to be understood that the invention is not to be limited except as set forth in the appended claims.

I claim:

1. A film extrusion apparatus comprising a body section, a pair of spaced orifice-defining lips, means for differentially adjusting said lips along the length thereof to regulate the contour of opposite sides of said orifice, and a laterally adjustable lip supporting block connected between each lip and said body section.

2. A film extrusion apparatus comprising a body section, a pair of spaced orifice-defining lips, means for differentially adjusting said lips along the length thereof to regulate the contour of opposite sides of said orifice, a laterally adjustable lip supporting block connected between each lip and said body section, a central passage-way for a film-forming composition in said body section, and a cartridge filter in said central passage-way.

3. A film extrusion apparatus comprising a body section, a pair of parallel blocks, defining an open passage therebetween, connected to said body section, said blocks movable relative to each other to increase or decrease the width of said passage, a pair of orifice-defining lips positioned on opposite sides of said passage, one of said lips positioned on each of said blocks in approximate alignment with opposite sides of said passage, and means for differentially adjusting said lips along the length thereof to increase or decrease the width of said orifice.

4. A film extrusion apparatus comprising a body section, a pair of parallel blocks, defining an open passage therebetween, connected to said body section, said blocks movable relative to each other to increase or decrease the width of said passage, means for moving said blocks, a pair of orifice-defining lips positioned on opposite sides of said passage, one of said lips positioned on each of said blocks in approximate alignment with opposite sides of said passage, and means for differentially adjusting said lips along the length thereof to increase or decrease the width of said orifice.

5. A film extrusion apparatus comprising a body section, a pair of parallel blocks, defining an open passage therebetween, connected to said body section, said blocks movable relative to each other to increase or decrease the width of said passage, screw means for moving said blocks, a pair of orifice-defining lips positioned on opposite sides of said passage, one of said lips positioned on each of said blocks in approximate alignment with opposite sides of said passage, and differential screw means for differentially adjusting said lips along the length thereof to increase or decrease the width of said orifice.

CLARENCE E. COLEMAN.